May 7, 1963
J. R. MILES
3,088,369
PROJECTION LENS SYSTEM
Filed Feb. 12, 1960
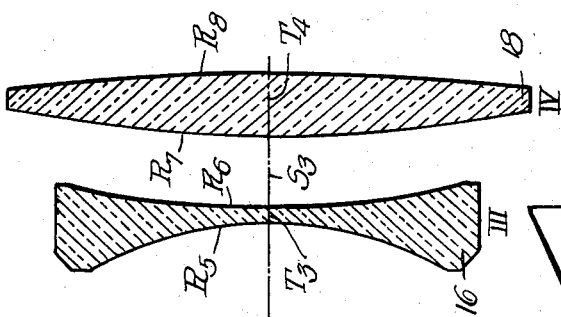
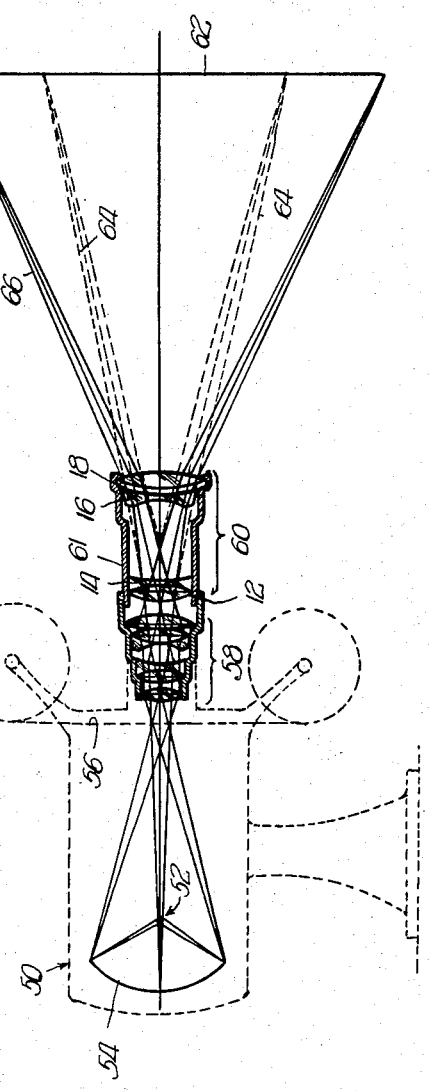
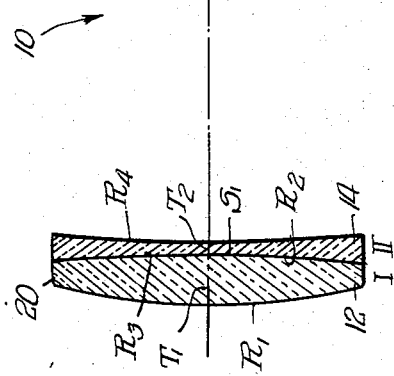
INVENTOR.
John R. Miles,
BY
Byron, Hume, Groen & Clement
ATTYS.

United States Patent Office 3,088,369
Patented May 7, 1963

3,088,369
PROJECTION LENS SYSTEM
John R. Miles, Glenview, Ill., assignor to
Fred E. Aufhauser
Filed Feb. 12, 1960, Ser. No. 8,279
10 Claims. (Cl. 88—57)

This invention pertains to optical devices used in the projections of images such as in motion picture projectors and in particular is related to the construction of a lens adapter to be used in conjunction with the standard projection lens for the purposes of magnifying the projected image.

In the projection of an image, such as in a motion picture projector, a source of light such as a large arc lamp is employed. The light from the arc is projected by means of a mirror, such as a concave ellipsoidal mirror, onto the area of the film which is being projected. The projected light rays are then received into a projection lens assembly placed on the other side of the film which images the film and its picture onto the screen.

Motion pictures, up until about 1952, were all what is known today as small screen projection. Due to the limitation of the projection apparatus prior to that time it was necessary to use small screens and projecting lenses that had long focal lengths. The focal length of the projection lenses used in theatre projectors seldom departed from the range of four inches to eight inches. When the wide screen motion pictures started after Cinerama was introduced, lenses with short focal lengths between 1½ and 4 inches were tried in projectors. These short focal length lenses increased the size of the picture, thus permitting an increase in size of the screen, but the quality of the edge of the screen was relatively poor. Furthermore, the illumination fell off badly at the edge due to the specific geometry of the arc lamp with its ellipsoidal reflector.

Several efforts were made to design and produce new short focal length lenses with extremely large apertures and high light gathering power. These efforts took the form of an anamorphic attachment in front of the lens such as in Cinemascope. The anamorphic attachment had the limitations of requiring special cameras and by the time viewings were made through the anamorphic units on both the camera and projector, the image suffered seriously from astigmatism as well as other defects.

Other efforts have been made to design attachments or adapters to slip on the front of the lenses in order to shorten the focal length of the basic lens. While these previous attempts have accomplished the purpose of shortening the focal length of the basic lens, none of them can produce an image of adequate quality nor do they have sufficient light projecting ability to make them feasible.

Therefore, it has been necessary to design a new lens adapter assembly having a primary feature and object of being adapted to be used in combination with a standard projecting lens unit. The lens adapter assembly is fully corrected for spherical aberrations, coma, astigmatism, and distortion. Thus as a direct result it produces an image of high quality. A further feature and object of the invention resides in provision of a lens adapter assembly which produces an image substantially twice the size of that projected by the standard projection lens assembly.

Another object and feature of the invention resides in the provision of a lens adapter that may be used in conjunction with a standard projection lens without any substantial alterations of either lens unit.

These and other features and objects of the invention will be apparent upon reading of the specification with reference to the following drawing.

In the drawing:
FIGURE 1 is a side view in section of the lens assembly; and
FIGURE 2 is a schematic view showing the lens adapter assembly used in conjunction with a projector and a projection screen.

Referring now to FIGURE 1, there is shown the lens assembly generally denoted by the numeral 10. The lens assembly is composed of four lens elements 12, 14, 16, and 18, and in which the elements 12 and 14 in one preferred embodiment are cemented together to form a doublet.

It is to be noted that the lens assembly as shown in FIGURE 1 and as will be described hereinafter is fully corrected for spherical aberrations, coma, astigmatism and distortion. In fact, the corrections of this system are such that there is compensation for some of the residual aberrations in the lens assembly to which it is attached. These compensations are such that the quality of the final projection is frequently as high as 30 percent better than the projection of the lens itself. This compensation is in the form of an improved Petzval sum and compensating off-axis spherical aberration.

As was mentioned previously, the first component 20 is a doublet which may or may not be cemented and in which the elements 12 and 14 are made of crown and flint glass, respectively. The component 20 is of a positive power with the first element 12 being double convex and the second element 14 being double concave.

The third element or second component 16 is airspaced from and optically aligned with the component 20, and is of a negative power. In this particular showing the element 16 is of a double concave construction and is made of crown glass.

The third component or fourth element 18 is airspaced and optically aligned with the preceding components 16 and 20 and is airspaced from the former. This component is made of flint glass and is of positive power, and in this particular instance is of a double convex construction.

It is to be noted that certain variations may be made in the construction of these lens elements. For example, the thickness of the lenses may vary as much as three or four units and the radii may vary in the following manner:

$R_1 \pm 5$ units  $R_5 \pm 2$ units
$R_2 \pm 100$ units  $R_6 \pm 3$ units
$R_3 \pm 100$ units  $R_7 \pm 5$ units
$R_4 \pm 25$ units  $R_8 \pm 10$ units The spaces may vary in the following manner:

$S_1 \pm 0$ to 3 units
$S_2 \pm 5$ units
$S_3 \pm 1.5$ units

It is to be understood that where any of these values in the formula are varied by the amounts indicated, technical changes must be made in the formula which are in the scope and experience of one skilled in the art of computing lenses of this nature.

The indices of refraction and the reciprocal dispersion ratio can be varied also with the same understanding. In this instance, the index of refraction can change by $\pm.005$, and the reciprocal dispersion ratio by $\pm 1.5$. Hereafter the index of refraction and reciprocal dispersion ratios will be indicated by the symbols $N_D$ and $v$.

Table I

[Total length of lens assembly ($R_1$ to $R_8$) equals 100 units]

| Lens | Radii | | Spacing | Thickness | | $N_D$ | $v$ |
|---|---|---|---|---|---|---|---|
| I | $R_1$ | 48.49 | | $T_1$ | 4.27 | 1.511 | 63.5 |
|   | $R_2$ | −548.34 | $S_1$   0 | | | | |
| II | $R_3$ | −548.34 | | $T_2$ | 1.23 | 1.673 | 32.2 |
|   | $R_4$ | +152.73 | $S_2$   81.73 | | | | |
| III | $R_5$ | −31.21 | | $T_3$ | 1.53 | 1.513 | 60.5 |
|   | $R_6$ | +83.23 | $S_3$   6.05 | | | | |
| IV | $R_7$ | +104.78 | | $T_4$ | 5.19 | 1.673 | 32.2 |
|   | $R_8$ | −233.93 | | | | | |

Being an afocal attachment, the focal length is infinite.

It is apparent from the preceding discussion that the data given in Table I is merely by way of example and is not to be construed as a limitation. These data may be varied in accordance with the criteria set forth hereinbefore as long as technical compensations are made for such variations.

A second embodiment of the invention is as follows:

Table II

[Total length of lens assembly ($R_1$ to $R_8$) equals 100 units]

| Lens | Radii | | Spacing | Thickness | | $N_D$ | $v$ |
|---|---|---|---|---|---|---|---|
| I | $R_1$ | 48.49 | | $T_1$ | 4.27 | 1.511 | 63.5 |
|   | $R_2$ | −548.34 | $S_1$   0 | | | | |
| II | $R_3$ | −548.34 | | $T_2$ | 1.23 | 1.673 | 32.2 |
|   | $R_4$ | +152.73 | $S_2$   81.73 | | | | |
| III | $R_5$ | −31.21 | | $T_3$ | 1.53 | 1.513 | 60.5 |
|   | $R_6$ | +83.23 | $S_3$   6.05 | | | | |
| IV | $R_7$ | +104.78 | | $T_4$ | 5.19 | 1.6643 | 35.88 |
|   | $R_8$ | −223.78 | | | | | |

Being an afocal attachment, the focal length is infinite. This second embodiment provides for a better color correction by the choice of a different glass for constructing the last lens.

Referring now to FIGURE 2, there is shown a schematic illustration of the subject invention in use. A projecting device such as that used for projecting motion pictures is generally denoted by the numeral 50. The projector 50 is provided with a source of light 52 such as a carbon arc or some equivalent device. The light from the source 52 is reflected by the mirror 54 onto the film strip 56, and from there into the projecting lens 58 which forms the image. The subject invention 60 is attached by suitable means onto the projecting lens 58 as shown in the drawings. In this instance the invention consists of a casing 61 which is provided with a flange or some suitable mechanical construction for grasping the camera casing in order to place the lens elements into optical alignment with the projection lens 58. The lens elements 12, 14, 16 and 18 are housed within the casing 61 and are constructed in accordance with the principles previously set forth. The image from the projector is formed on the screen 62 according to conventional practices.

By way of illustration the image that will be formed by the standard projection element is indicated by the dotted lines 64. The image that will be formed as a result of the adapter is indicated by the dotted lines 66. The size of the latter image, as mentioned previously, will be approximately twice the size of that formed by the standard projection lens.

It is now apparent that the subject invention provides a means for obtaining an image of an increased size as well as of improved quality by simply attaching it onto the projector. This attachment does not require any substantial modification of the projector itself and may be used without any special skills on behalf of the operator.

It is to be noted that the subject invention may be used in combination with 16 mm., 35 mm. and 70 mm. projectors and is not limited to any one particular size. Actually the invention may be used for many types of projectors in addition to the motion picture field and with many types of photography where there is a requirement for larger angular field.

Although certain specific embodiments have been set forth hereinbefore, it is to be understood that these are merely by way of example, and in no manner to be construed as limitations. It is apparent that certain modifications may be made within the scope of the claims without departing from the spirit of the invention.

What is claimed is:

1. A lens assembly adapted for use in combination with a projection lens assembly for magnifying the size of the projected image comprising four lens elements in which the first lens element is double convex and the second is double concave, and in which the third and fourth elements are airspaced and aligned with the first and second elements, and in which the third element is double concave with its first and second surfaces having radii of curvature of .29 to .33 and .80 to .86 times the total length of the lens assembly, respectively, and in which the fourth element is double convex with its first and second surfaces having radii of curvature of .99 to 1.09 and 2.23 to 2.43 times said total length, respectively.

2. A lens assembly according to claim 1 in which said third and fourth elements have indices of refraction of 1.513±.005 and 1.673±.005, respectively, and reciprocal dispersion ratios of 60.5±1.5 and 35.88±1.5, respectively.

3. A lens assembly adapted for use in conjunction with a projection lens assembly for magnifying the projected image comprising four lens elements which have the following constructional data:

[Total length of lens assembly ($R_1$ to $R_8$) equals 100 units]

| Lens | Radii | | Spacing | Thickness | | $N_D$ | $v$ |
|---|---|---|---|---|---|---|---|
| I | $R_1$ | 48.49 | | $T_1$ | 4.27 | 1.511 | 63.5 |
|   | $R_2$ | −548.34 | $S_1$   0 | | | | |
| II | $R_3$ | −548.34 | | $T_2$ | 1.23 | 1.673 | 32.2 |
|   | $R_4$ | +152.73 | $S_2$   81.73 | | | | |
| III | $R_5$ | −31.21 | | $T_3$ | 1.53 | 1.513 | 60.5 |
|   | $R_6$ | +83.23 | $S_3$   6.05 | | | | |
| IV | $R_7$ | +104.78 | | $T_4$ | 5.19 | 1.673 | 32.2 |
|   | $R_8$ | −233.93 | | | | | | wherein $N_D$ and $v$ are the index of refraction and reciprocal dispersion ratio, respectively.

4. In an image projecting apparatus the combination of a projection lens assembly and a lens adapter assembly for increasing the size of the projected image, said lens adapter assembly comprising four lens elements in which the first lens element is double convex and the second is double concave, and in which the third and fourth elements are airspaced and aligned with the first and second elements and in which the third element is double concave with its first and second surfaces having radii of curvature of .29 to .33 and .80 to .86 times the total length of the lens assembly, and in which the fourth element is double convex with its first and second surfaces having radii of curvature of .99 to 1.09 and 2.23 to 2.43 times said total length, and in which said third and fourth elements have indices of refraction of 1.513±.005 and 1.673±.005, respectively, and reciprocal dispersion ratios of 60.5±1.5 and 32.2±1.5, respectively.

5. In an image projecting apparatus the combination of a projection lens assembly and a lens adapter assembly for increasing the size of the projected image, said lens adapter assembly comprising a four lens unit having the following constructional data:

[Total length of lens assembly ($R_1$ and $R_8$) equals 100 units]

| Lens | Radii | Spacing | Thickness | $N_D$ | $v$ |
|---|---|---|---|---|---|
| I | $R_1$ 48.49 | | $T_1$ 4.27 | 1.511 | 63.5 |
| | $R_2$ −548.34 | $S_1$ 0 | | | |
| II | $R_3$ −548.34 | | $T_2$ 1.23 | 1.673 | 32.2 |
| | $R_4$ +152.73 | $S_2$ 81.73 | | | |
| III | $R_5$ −31.21 | | $T_3$ 1.53 | 1.513 | 60.5 |
| | $R_6$ +83.23 | $S_3$ 6.05 | | | |
| IV | $R_7$ +104.52 | | $T_4$ 5.19 | 1.6643 | 35.88 |
| | $R_8$ −223.78 | | | | | wherein $N_D$ and $v$ are the index of refraction and reciprocal dispersion ratio, respectively.

6. A lens assembly adapted for use in conjunction with a projection lens assembly for magnifying the projected image comprising four lens elements which have the following constructional data:

[Total length of lens assembly ($R_1$ and $R_8$) equals 100 units]

| Lens | Radii | Spacing | Thickness | $N_D$ | $v$ |
|---|---|---|---|---|---|
| I | $R_1$ 48.49 | | $T_1$ 4.27 | 1.511 | 63.5 |
| | $R_2$ −548.34 | $S_1$ 0 | | | |
| II | $R_3$ −548.34 | | $T_2$ 1.23 | 1.673 | 32.2 |
| | $R_4$ +152.73 | $S_2$ 81.73 | | | |
| III | $R_5$ −31.21 | | $T_3$ 1.53 | 1.513 | 60.5 |
| | $R_6$ +83.23 | $S_3$ 6.05 | | | |
| IV | $R_7$ +104.52 | | $T_4$ 5.19 | 1.6643 | 35.88 |
| | $R_8$ −223.78 | | | | | wherein $N_D$ and $v$ are the index of refraction and reciprocal dispersion ratio, respectively.

7. A lens assembly adapted for use in combination with a projection lens assembly for magnifying the size of the projected image comprising four lens elements in which the first lens element is double convex and the second is double concave, and in which the third and fourth elements are airspaced and optically aligned with the first and second elements, and in which the third element is double concave with its first and second surfaces having radii of curvature of .29 to .33 and .80 to .86 times the total length of the lens assembly, respectively, and in which the fourth element is double convex with its first and second surfaces having radii of curvature of .99 to 1.09 and 2.13 to 2.33 times said total length, respectively.

8. A lens assembly according to claim 7 in which said third and fourth elements have indices of refraction of 1.513±.005 and 1.6643±.005, respectively, and, reciprocal dispersion ratios of 60.5±1.5 and 35.88±1.5, respectively.

9. A lens assembly adapted for use in combination with a projection lens assembly for magnifying the size of the projected image comprising first, second and third lens components in which the second and third lens components are air spaced and aligned with said first component, and in which the second component is double-concave with its first and second surfaces having radii of curvature of .29 to .33 and .80 to .86 times the total length of the lens assembly, respectively, and in which the third component is double-convex with its first and second surfaces having radii of curvature of .99 to 1.09 and 2.23 to 2.43 times the total length, respectively.

10. A lens assembly according to claim 9 in which said second and third components have indices of refraction of 1.513±.005 and 1.673±.005, respectively, and reciprocal dispersion ratios of 60.5±1.5 and 35.88±1.5, respectively.

References Cited in the file of this patent

UNITED STATES PATENTS

| 2,421,927 | Cox | June 10, 1947 |
| 2,582,085 | Toole | Jan. 8, 1952 |

FOREIGN PATENTS

| 796,445 | Great Britain | June 11, 1958 |